United States Patent
Maul et al.

[11] 3,711,562
[45] Jan. 16, 1973

[54] PROCESS FOR PREPARING BROMINATED STYRENE HALOCYCLOPENTADIENE COMPOUNDS

[75] Inventors: James J. Maul; James E. Stevens, both of Grand Island; Ronald L. Schendel, Niagara Falls, all of N.Y.

[73] Assignee: Hooker Chemical Corporation, Niagara Falls, N.Y.

[22] Filed: June 29, 1970

[21] Appl. No.: 50,602

[52] U.S. Cl...........260/649 R, 260/611 A, 252/8.1, 260/45.7 R, 260/649 F, 260/880, 260/DIG. 24
[51] Int. Cl..............................................C07c 25/18
[58] Field of Search ....260/649, 649 F, 650 R, 611 A

[56] References Cited

UNITED STATES PATENTS

| | | | |
|---|---|---|---|
| 3,285,965 | 11/1966 | Jenkner | 260/649 F |
| 3,170,961 | 2/1965 | Britton et al. | 260/650 R |
| 2,607,802 | 8/1952 | Britton et al. | 260/650 R X |

FOREIGN PATENTS OR APPLICATIONS

| | | | |
|---|---|---|---|
| 860,198 | 12/1952 | Germany | 260/650 R |
| 991,067 | 5/1965 | Great Britain | 260/649 |
| 986,634 | 3/1965 | Great Britain | 260/650 R |

OTHER PUBLICATIONS

Williamson et al., J.A.C.S 86, 4,021–4,025, 1964.
Sittig, Combine Hydrocarbons and Halogens for Profit, Noyes Development Corp., Park Ridge, N.J., 1968, pp. 175–177.

*Primary Examiner*—Howard T. Mars
*Attorney*—Peter F. Casella, Donald C. Studley, Richard P. Mueller, James F. Mudd and William J. Schramm

[57] ABSTRACT

Compounds of the structure

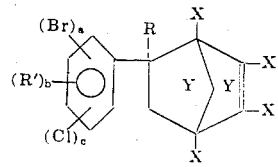

are prepared by reacting the Diels-Alder adduct of a styrene compound and a halocyclopentadiene compound with a halogenating agent which is a mixture of chlorine and bromine in a two reactor process, wherein X is a halogen independently selected from the group consisting of fluorine, chlorine and bromine; Y is independently selected from the group consisting of alkyl of one to 10 carbon atoms, alkoxy of one to 10 carbon atoms, monohaloalkyl of one to 10 carbon atoms and halogen, wherein said halo- and halogen are independently selected from the group consisting of fluorine, chlorine and bromine; R and R' are independently selected from the group consisting of hydrogen and lower alkyl of one to six carbon atoms; $a$ ranges from about 3 to 4, $c = 0$ to 1 and $b$ is 0 to 1.

19 Claims, 1 Drawing Figure

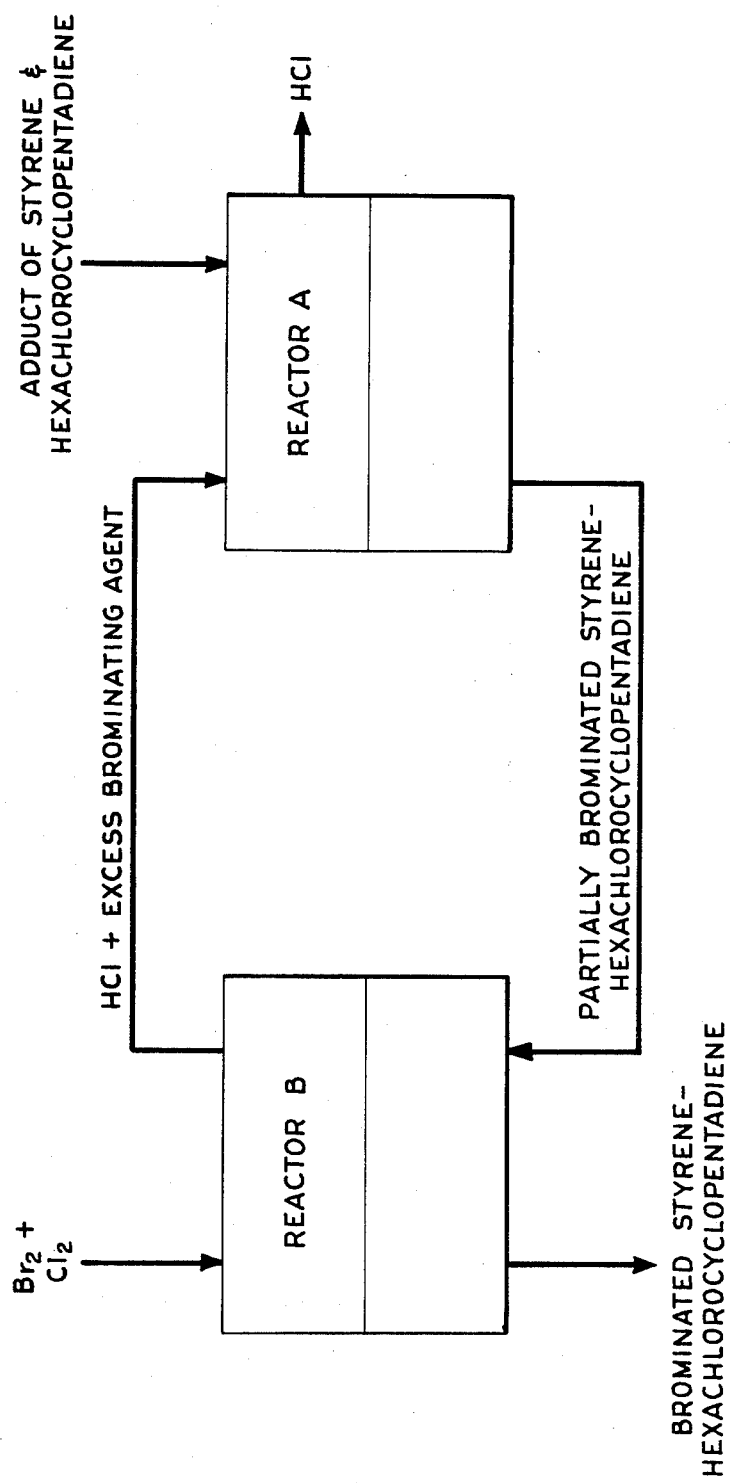

PROCESS FOR PREPARING BROMINATED STYRENE HALOCYCLOPENTADIENE COMPOUNDS

BACKGROUND OF THE INVENTION

Due to the increase legislative mandates, fire retardancy is becoming of increasing importance. Various means are available for introducing fire retardancy into a combustible composition. One approach is the use of various additives. Halogenated cyclopentadienes are useful backbones for the production of fire retardant materials. In addition, because of the fire retardant attributes of the bromine atom, it would be worth while to incorporate it also in a composition. However, because of the high cost of bromine, an economic means must be found to utilize all bromine in any reaction it takes place in. Some patents which described the utilization of mixtures of chlorine and bromine as a bromination technique are U.S. Pats. Nos. 2,607,802; 2,640,064; 3,012,035; 2,013,791 and 3,297,675. The art however has not described a means of using almost all bromine used as a reactant.

It is an object of this invention to produce brominated styrene halocyclopentadiene adducts in an economical way. It is also an object to produce in a high yield a decahalogenated product, wherein the benzene ring has up to four bromine atoms.

SUMMARY OF THE INVENTION

A process is described for preparing halogenated styrene halocyclopentadiene compounds by reacting the Diels-Alder adduct of a styrene compound and a halocyclopentadiene compound with a halogenating agent to produce from about three to about four halogen atoms on the aromatic ring. Preferably, the halogen atoms are bromine and the bromination procedure utilized is a mixture of chlorine and bromine, in a multi reactor system.

DESCRIPTION OF PREFERRED EMBODIMENTS

A recycle process is described for preparing compounds of the formula

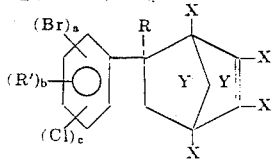

wherein R and R' are independently selected from the group consisting of hydrogen or alkyl of one to six carbon atoms, X is a halogen independently selected from the group consisting of fluorine, chlorine, and bromine; Y is independently selected from the group consisting of alkyl of one to 10 carbon atoms, preferably alkyl of one to six carbon atoms, alkoxy of one to 10 carbon atoms, preferably alkoxy of one to six carbon atoms, monohaloalkyl of one to 10 carbon atoms, preferably monohaloalkyl of one to six carbon atoms, and halogen, wherein said halo- and said halogen are independently selected from the group consisting of fluorine, chlorine and bromine; $a$ ranges from about 3 to 4; $c=0$ to 1 and $b$ is 0 to 1;

comprising the steps, 1. reacting in a first vessel (see reactor B of the drawing) a brominating agent with a styrene halocyclopentadiene of the structure

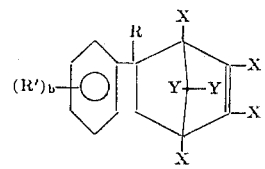

2. charging a second vessel (see reactor A of the drawing) with a styrene halocyclopentadiene compound;

3. passing unreacted brominating agent from said first reactor to said second reactor;

4. recovering the brominated product from said first reactor, 5. introducing into said first reactor at least a portion of the mixture from said second reactor, 6. recharge said second reactor with additional styrene halocyclopentadiene and 7. repeat steps 1 through 6.

A preferred embodiment is to take the mother liquor from step four and pass it to said second reactor.

For process economies, the two reactors can be charged simultaneously so that while the brominating agent is being introduced into step 1, the unreacted brominating agent can be passed to the other reactor to start the bromination reaction in said second reactor. If one desires, the two reactors need not be charged simultaneously. If the latter procedure is followed the unreacted brominating agent from step 1, above, will pass to the second reactor and there go into the solvent for the styrene halocyclopentadiene which is subsequently added. Steps 1, 2 and 3 can also be performed simultaneously and need not be isolated steps.

The main advantage of the multi-reactor system is to utilize substantially all bromine and styrene halocyclopentadiene values introduced into the reaction. In essence, the additional reactor is used to scrub the brominating agent from the exit gases of the main reactor and thereby partially brominate fresh styrene halocyclopentadiene adduct.

The invention is concerned with the utilization of at least two reactors. However, more than two and up to four vessels may likewise be employed. Because of economic considerations, it is preferred that the two reactor operation be employed because substantially all of the bromine is reacting.

For a description of the process, reference may be made to the drawing, which is a flow chart of the halogenation process.

Introduced into reactor A is the adduct of a styrene and a halo-cyclopentadiene. HCl and excess bromination agent from reactor B is also introduced into reactor A. When the brominating agent is fully utilized or there is no further reaction in reactor B, that is, the reaction has substantially ceased, the unreacted brominating agent is passed to reactor A, at least a portion of the brominated product from reactor B is separated and recovered and at least a portion of the styrene halocyclopentadiene mixture from reactor A is passed to reactor B. There chlorine and bromine are introduced to complete the bromination of the benzene ring. HCl is a by-product of reactor A.

The temperatures to be employed in the invention are such that the reaction takes place in the liquid phase for both reactors. In the reactor A, the temperature that may be employed ranges from about −10° C. to about 150° C., preferably from about 0 to about 80° C. and even more preferably at about 25° C. The low temperature aids in producing the desired aromatic tetrabromo product and therefore improves the ratio of tetrabromo/tribromomonochloro product. Applicant does not wish to be bound to a theory of the reaction process; however, it is believed that some of the brominating agent that is distilled from reactor B to reactor A is the compound, bromine chloride (BrCl). The remaining portion of the brominating agent from reactor B is a mixture of bromine and chlorine. The temperature employed in reactor B ranges from about −10° C. to about 150° C., preferably about 0° C. to about 80° C. and even more preferably at about 25° C. The halogenating agent that is employed in the reactor B is a mixture of chlorine and bromine either premixed or introduced as a separate stream. When the reaction is complete, the temperature in the system is raised from the reaction temperature to a temperature from about 100° C to about 180° C., preferably from about 120° C. to about 160° C. so that the mixture of unreacted bromine, chlorine and bromine chloride may be removed and introduced into said reactor A. The halogen is somehow combined and needs to be separated which is done by increasing the temperature.

The total amount of halogenating agent employed ranges from about 1 to about 8 moles per mole of styrene halocyclopentadiene adduct, preferably about 3 to about 6 moles and even more preferably at about 4.4 moles to 1 mole of a styrene halocyclopentadiene adduct.

As the ratio of halogenating agent to styrene halocyclopentadiene adduct will vary, so also will the amount of chlorine and bromine likewise vary. It is preferred that the ratio of bromine to chlorine range from about 0.5 to about 1.5 moles of bromine per mole of chlorine, preferably, equimolar, and even more preferably an excess of chlorine, of about 1 mole $BR_2$ per 1.1 moles $Cl_2$.

Chlorine and bromine are introduced into Reactor B preferably by premixing the materials and introducing them as one stream. However, a separate stream of chlorine and a separate stream of bromine may also be utilized.

The halogenated styrene halocyclopentadiene adduct is normally recovered by any of the normal means such as crystallization.

The reaction preferably takes place at atmospheric pressure.

The reaction may be run without catalysts; however, catalysts are preferred.

When catalysts are used it is preferred that they be metals or metal halides such as metal chlorides or metal bromides. The preferred metals that may be used or the halides are as follows; iron, ferric chloride, ferric bromide, antimony, antimony chloride, antimony bromide, aluminum, aluminum chloride, aluminum bromide etc. The preferred catalyst is antimony halide such as the chloride. Other metals that may be used are zinc, bismuth, titanium, copper, tellurium, mercury, lead, magnesium, cadmium, selenium, molybdenum, their chlorides or bromides or mixtures thereof.

The halogenation reaction need not take place in the presence of solvents. However, it is preferred for obtaining a more pure product that solvents be employed. Various halogenated aliphatics of from one to six carbon atoms may be employed, such as acetylene tetrachloride, carbon tetrachloride, methylene chloride, trichloroethane, trichloromethane, hexachlorobutadiene, etc. The solvent to be employed is one that is inert to the reactants and the reaction products. The reactants that can be used in the reaction sequence are as follows. The most preferred is the Diels-Alder reaction product of styrene and hexachlorocyclopentadiene. In discussion of the reactants below, any one of the other reaction products may also be employed, i.e., product resulting from the Diels-Alder reaction of a styrene derivative and a halocyclopentadiene derivative. Some reactants that may be used in the Diels-Alder reaction are as follows.

Some examples of the styrene compounds that can be used in the Diels-Alder reaction, the product of which is used as a reactant in this invention are styrene or compounds of the structure

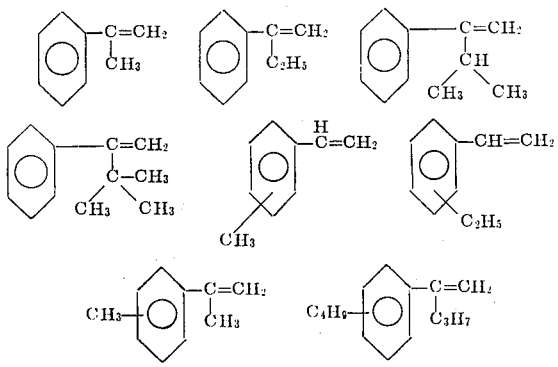

Some halogenated cyclopentadienes falling within this invention are as follows: hexahalocyclopentadienes, such as hexachlorocyclopentadiene, hexafluorocyclopentadiene, hexabromocyclopentadiene, etc; monoalkyl pentahalo cyclopentadienes, such as, 5-methyl-pentachlorocyclopentadiene; 5-methyl pentabromocyclopentadiene; 5-hexyl pentafluorocyclopentadiene; 5-decyl pentachlorocyclopentadiene; dialkyltetrahalocyclopentadienes, such as 5,5-dimethyl tetrachlorocyclopentadiene; 5,5-dibutyl tetrachlorocyclopentadiene; 5,5-dihexyl tetrabromocyclopentadiene; 5,5-dinonyl tetrafluorocyclopentadiene; 5,5-didecyl tetrachlorocyclopentadiene; alkoxy tetrahalocyclopentadienes, 5-methoxy pentachloro or 5,5-dimethoxy tetrachlorocyclopentadiene; 5-hexyloxy pentabromo or 5,5-dihexyloxy tetrabromocyclopentadiene; 5-decyloxy pentachloro or 5,5-didecyloxy tetrachlorocyclopentadiene; 5-methoxy pentafluoro or 5,5-dimethoxy tetrafluorocyclopentadiene; haloalkyl halocyclopentadienes, such as 5-chloromethylpenta chlorocyclopentadiene; 5,5-bis(chloromethyl) tetrachlorocyclopentadiene; 5-bromoethyl pentabromocyclopentadiene; 5,5-bis(bromohexyl)tetrachlorocyclopentadiene; 5-fluorodecyl pentachlorocyclopentadiene; 5,5-bis(fluorodecyl)tetrafluorocyclopentadiene.

Having described in general the invention, below are preferred embodiments. All examples are in degrees centigrade and all percentages are percentages by weight; all moles are gram moles unless otherwise indicated.

EXAMPLE 1

Reactor B was charged with 120 milliliters of acetylene tetrachloride solvent, the Diels-Alder adduct of styrene and hexachlorocyclopentadiene, and antimony trichloride catalyst. Reactor A was charged with 150 milliliters of acetylene tetrachloride solvent, adduct of styrene hexachlorocyclopentadiene and antimony trichloride catalyst. The addition funnel was charged with bromine and chlorine and acetylene tetrachloride. The contents of the funnel were added to reactor B at such a rate that the reaction was maintained at or below 40 degrees centigrade. With a slight nitrogen purge, the excess brominating agents was distilled from reactor B and passed to reactor A at such a rate that the temperature of reactor A was at or less than 40° C. The mixture in each reactor was stirred for a period of time ranging from about 3 minutes to about 1 hour and 10 minutes. Reactor B was heated to about 155° C. in order to drive off the unreacted brominating agent. The material in Reactor B was cooled with stirring to room temperature and the solid product was filtered. The solid was washed with 80 milliliters of acetylene tetrachloride and then the wash liquor was concentrated by evaporation. The contents of reactor A were then transferred to reactor B. Reactor A was then recharged with the combined filtrate and concentrated wash liquors from the product of reactor B and adduct of styrene and hexachlorocyclopentadiene and additional antimony trichloride. The halogen addition funnel was recharged with bromine, chlorine, and acetylene tetrachloride. The procedure was followed and repeated for number of runs as is listed below. The reaction processes were altered according to that described below.

CYCLIC BROMINATION OF S-HCCP*

| Cycle number | Addition funnel | | Reactor B | | | Reactor A | | | Solvent | Yield, percent | Melting point of sample of product, °C. |
|---|---|---|---|---|---|---|---|---|---|---|---|
| | Br₂ | Cl₂ | ATC, ml. | S-HCCP*, moles | SbCl₃, g. | ATC, ml. | S-HCCP*, moles | SbCl₃, g. | | | |
| 1 | 1.2 moles, 50% excess. | 1.2 moles, 50% excess. | 50 | 0.4 | 5 | 120 | 0.4 | 5 | 150 ml. ATC | 78.0 | 172.4 |
| 2 | 0.84 moles, 5% excess. | 0.92 moles, 15% excess. | 25 | | 3 | | 0.4 | 3 | 150 ml. mother liquor from number 1. | 77.6 | 172-5 |
| 3 | 0.84 moles, 5% excess. | 0.92 moles, 15% excess. | 25 | | | | 0.4 | 2 | 200 ml. mother liquor and concentrated wash liquor from number 2. | 88.1 | 172.6 |
| 4 | 0.84 moles, 5% excess. | 0.92 moles, 15% excess. | 25 | | | | 0.4 | 2 | 150 ml. mother liquor and concentrated wash liquor from number 3. | 92.1 | 175-8 |
| 5 | 0.72 moles, 10% deficit. | 0.83 moles, 5% excess. | 25 | | | | 0.4 | | 170 ml. mother liquor and concentrated wash liquor from number 1. | 87.4 | 176.5-9 |
| 6 | 0.8 moles. | 0.88 moles, 10% excess. | 25 | | | | 0.4 | 2 | 185 ml. mother liquor and concentrated wash liquor from number 5. | 104.3 | 174-6 |
| 7 | 0.88 moles, 10% excess. | 0.96 moles, 20% excess. | 25 | | | | 0.4 | 2 | 175 ml. mother liquor and concentrated wash liquor from number 6. | 97.5 | 175.5-178 |
| 8 | 0.84 moles, 5% excess. | 0.88 moles, 10% excess. | 25 | | | | 0.4 | 2 | 175 ml. mother liquor and concentrated wash liquor from number 7. | 97.5 | 173-7 |
| 9 | 0.84 moles, 5% excess. | 0.88 moles, 10% excess. | 25 | | | | 0.4 | 2 | 154 ml. mother liquor and concentrated wash liquor from number 8. | 95.3 | 175-8 |

*S-HCCP is Diels Alder adduct of styrene and hexachlorocyclopentadiene.
**ATC = Acetylene tetrachloride.

CYCLIC BROMINATION OF S-HCCP*

| Cycle number | Addition funnel | | Reactor A | | | Reactor B | | | Solvent | Yield percent | Melting point, °C. |
|---|---|---|---|---|---|---|---|---|---|---|---|
| | Br₂ | Cl₂ | ATC, ml. | S-HCCP*, moles | SbCl₃, g. | ATC,** ml. | S-HCCP* moles | SbCl₃, g. | | | |
| 1 | 1.2 moles, 50% excess. | 1.2 moles, 50% excess. | 50 | 0.4 | 5 | 125 | 0.4 | 5 | 150 ml. ATC | 65.3 | 1731-75 |
| 2 | 0.84 moles. | 0.9 moles. | 25 | | | | 0.4 | 2 | 200 ml. mother liquor and concentrated wash liquor from number. | 75.1 | 171-175 |
| 3 | 0.84 moles, 5% excess. | 0.88 moles, 10% excess. | 25 | | | | 0.4 | 2 | 175 ml. mother liquor and concentrate wash liquor from number 2. | 104.1 | 171-176 |
| 4 | 0.84 moles, 5% excess. | 0.88 moles, 10% excess. | 25 | | | | 0.4 | 2 | 154 ml. mother liquor and concentrated wash liquor from number 3. | 93.5 | 175-177.5 |
| 5 | 0.84 moles, 5% excess. | 0.88 moles, 10% excess. | 25 | | | | 0.4 | 2 | 173 ml. mother liquor and concentrated wash liquor from number 4. | 87.0 | 176.5-8.5 |

*S-HCCP = Diels-Alder adduct of styrene and hexachlorocyclopentadiene.
**ATC = acetylene tetrachloride.

The brominated styrene halocyclopentadienes produced by this invention are useful as fire retardant additives for various polymers and plastics, especially acrylonitrile - butadiene - styrene (ABS) systems. For other plastics and polymers see U.S. application Ser. No. 51,008, filed on even date herewith.

It is understood that the following claims are intended to cover all of the generic and specific features of the invention herein described and all statements of the scope of the invention which is a matter of language, might be said to fall there between.

We claim:

1. A process for preparing a brominated styrene halocyclopentadiene compound of Formula I

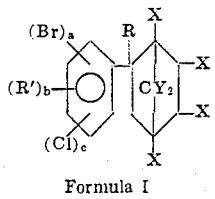

Formula I wherein R and R' are independently selected from the group consisting of hydrogen and lower alkyl of one to six carbon atoms; X is a halogen independently selected from the group consisting of fluorine, chlorine and bromine; Y is independently selected from the group consisting of alkyl of one to 10 carbon atoms, alkoxy of one to 10 carbon atoms, monohaloalkyl of one to 10 carbon atoms, and halogen, wherein said halogen and said halo- are independently selected from the group consisting of fluorine, chlorine and bromine; $a$ ranges from about 3 to 4, $b = 0$ to 1, and $c = 0$ to 1 comprising the steps 1. reacting in a first vessel and in the liquid phase at a temperature within the range of about $-10°$ and about $150°$ C., about 1 to about 8 mole proportions of brominating agent comprising a mixture of bromine and chlorine in which mixture there is present from about 0.5 to about 1.5 moles of bromine per mole of chlorine, with one mole proportion of a styrene halocyclopentadiene adduct of Formula II

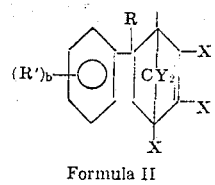

Formula II 2. charging a second vessel with a styrene halocyclopentadiene adduct of Formula II,
3. distilling unreacted brominating agent from said first vessel to said second vessel which is maintained at a temperature within the range of about $-10°$ to about $150°$ C.,
4. recovering the brominated product from said first vessel,
5. introducing into said first vessel at least a portion of the mixture from said second vessel,
6. recharging said second vessel with a styrene halocyclopentadiene adduct of Formula II,
7. reacting the mixture in said first vessel with additional brominating agent, and
8. repeating steps 3 through 7.

2. The process of claim 1 wherein the temperature in said first vessel is maintained within the range of about $0°$ to about $80°$ C.

3. The process of claim 2 wherein the temperature in said first vessel is maintained at about $25°$ C.

4. The process of claim 1 wherein the temperature in said second vessel is maintained within the range of about $0°$ to about $80°$ C.

5. The process of claim 4 wherein the temperature in said second vessel is maintained at about $25°$ C.

6. The process of claim 1 wherein the brominating agent distilled from said first vessel to said second vessel comprises a mixture of bromine chloride, bromine and chlorine.

7. The process of claim 1 wherein distillation of the unreacted brominating agent is assisted by a slight nitrogen purge of said first vessel.

8. The process of claim 1 comprising passing the liquid mixture from said second vessel to said first vessel after the reaction in said first vessel has substantially ceased.

9. The process of claim 1 wherein after the reaction in said first vessel has substantially ceased, the contents of said first vessel are heated to a temperature within the range of from about $100°$ to about $180°$ C. to distill a mixture comprising bromine chloride, bromine and chlorine from said first vessel to said second vessel.

10. The process of claim 1 wherein R' is hydrogen, $a$ is 4, $b = 1$ and $c = 0$.

11. The process of claim 1 wherein R' is hydrogen, $a$ is 3, $b = 1$ and $c = 1$.

12. The process of claim 1 wherein the mixture of bromine and chlorine contains from about 1.0 to about 1.1 moles of chlorine per mol of bromine.

13. The process of claim 1 wherein X and Y are chlorine.

14. The process of claim 8 wherein R and R' are both hydrogen.

15. The process of claim 1 wherein R is hydrogen.

16. The process of claim 1 wherein R' is hydrogen.

17. A process of claim 1 wherein the styrene halocyclopentadiene adduct is reacted in the presence of a solvent which is selected from the group consisting of carbon tetrachloride, methylene chloride, trichloroethane, trichloromethane, acetylene tetrachloride, and hexachlorobutadiene.

18. The process of claim 17 wherein the solvent is acetylene tetrachloride.

19. The process of claim 1 wherein the halogenated styrene halocyclopentadiene adduct is recovered by crystallization.

* * * * *